Patented June 23, 1936

2,045,203

UNITED STATES PATENT OFFICE 2,045,203

DECOMPOSITION OF ENGEL SALT

Friedrich Rüsberg, Berlin-Niederschoneweide, Germany, assignor to Kali-Chemie, Aktiengesellschaft, Berlin, Germany No Drawing. Application March 1, 1933, Serial No. 659,239. In Germany March 4, 1932

4 Claims. (Cl. 23—64)

This invention relates to the manufacture of potassium carbonate from potassium salts of strong mineral acids and magnesium carbonate trihydrate.

It is known to make potassium carbonate by treating a suspension of magnesium carbonate trihydrate with carbon dioxide in an aqueous solution of potassium chloride, whereby a crystal water precipitates containing double salt of potassium bicarbonate and magnesium carbonate, named Engel salt, which, on decomposition with water at raised temperature, furnishes an aqueous solution of potassium bicarbonate. This potassium bicarbonate may contain potassium carbonate, and solid magnesium bicarbonate trihydrate, which may be used again for the manufacture of potassium carbonate from fresh potassium chloride. This process, in which the potassium chloride may be replaced by potassium salts of other strong mineral acids, such as potassium sulfate, is called the Engel-Precht method and is supposed to take place according to the following equations:

(1) $2KCl + 3(MgCO_3.3H_2O) + CO_2 + H_2O =$
$2(KHCO_3.MgCO_3 4H_2O) + MgCl_2 + H_2O$;

(2) $KHCO_3.MgCO_3.4H_2O + H_2O =$
$MgCO_3.3H_2O + KHCO_3 + 2H_2O$.

The magnesium carbonate trihydrate obtained by the decomposition of Engel salt is one of the starting materials necessary for the manufacture of Engel salt. It is therefore desirable to use this decomposition trihydrate in a cycle. This creates, however, considerable difficulties in practice. The decomposition of the Engel, by which is meant the double salt of magnesium carbonate and potassium bicarbonate, salt is carried out with as little water as possible, in order to obtain an aqueous solution of potassium bicarbonate concentrated as much as possible, in order to reduce the costs for evaporation, when making potassium carbonate from said aqueous solution. The magnesium carbonate trihydrate obtained under these conditions is not very reactive for making fresh Engel salt, as it contains a considerable amount of basic magnesium carbonate, which is not suitable for the reaction leading to the formation of Engel salt. The presence of basic magnesium carbonate in the said magnesium carbonate trihydrate has further the disadvantage, that undesirable sludges are formed in the manufacture of Engel salt with such a trihydrate. It is therefore usual to subject the magnesium carbonate trihydrate obtained under the conditions described above to an expensive regeneration.

The main object of the present invention is a method for the decomposition of Engel salt, whereby a magnesium carbonate trihydrate in the reactive form is obtained, which is suitable without previous regeneration for the manufacture of Engel salt.

The present decomposition method for Engel salt furthermore consists in producing a magnesium carbonate trihydrate entirely free from or poor in basic magnesium carbonate.

A still further object of the present method for the decomposition of Engel salt is the obtention of a magnesium carbonate trihydrate, from which Engel salt may be manufactured entirely without sludge formation or with only slight sludge formation.

According to the invention the decomposition of Engel salt with water is carried out at temperatures between 40 and 80° C. and with such amounts of water, that the aqueous solution of potassium bicarbonate with possibly a small amount of potassium carbonate contains below 76 grams of $K_2CO_3$ per liter. The solution may contain for example 75 grams of $K_2CO_3$ per liter and less. In the preferred form of the invention, water is used for the decomposition of Engel salt, in amounts that lead to the formation of aqueous solutions of potassium bicarbonate with not more of this bicarbonate than corresponds to 60 g. $K_2CO_3$ per liter. Under these conditions the magnesium carbonate trihydrate obtained by the decomposition is reactive for the formation of Engel salt entirely without sludge or with only a small amount of sludge formation and which requires no regeneration.

200 kg. of Engel salt containing 22.3% of $K_2CO_3$ are decomposed by stirring with 890 liters of water at about 70° C. 625 liters of aqueous potassium bicarbonate solution containing an amount of this bicarbonate corresponding to 59.5 g. $K_2CO_3$ per liter are separated by filtration from the magnesium carbonate trihydrate formed. This trihydrate is suspended in an aqueous solution of potassium chloride and the suspension treated with carbon dioxide, whereby is obtained 120 kg. of Engel salt with 22.0% of $K_2CO_3$. Only 2.5 kg. of basic magnesium carbonate are formed, which amount corresponds to 2.1% of the Engel salt obtained. The potassium bicarbonate solution obtained is in the usual manner worked up to potassium carbonate.

The potassium chloride in the example may be replaced by other potassium salts of strong mineral acids, such as potassium sulfate. The temperature during the decomposition of the Engel salt may be varied, between 40 and 80° C. The decomposition may be carried out at pressures above atmospheric pressure.

The foregoing detailed example has been given for clearness of understanding only, and no unnecessary limitations should be understood therefrom, but the appended claims should be construed as broadly as permissible in view of the prior art.

I claim:

1. A method for decomposing the double salt of magnesium carbonate and potassium bicarbonate generally known as Engel salt with water which consists in treating the Engel salt at temperatures between 40 and 80° C. with at least such an amount of water as is necessary to obtain an aqueous decomposition liquid containing potassium bicarbonate in an amount corresponding to 75 grams of $K_2CO_3$ per liter.

2. A method for decomposing the double salt of magnesium carbonate and potassium bicarbonate generally known as Engel salt with water which consists in treating the Engel salt at temperatures between 40 and 80° C. with at least such an amount of water as is necessary to obtain an aqueous decomposition liquid containing potassium bicarbonate in an amount corresponding to 60 g. of $K_2CO_3$ per liter.

3. A method for making potassium salts of carbonic acid which consists in treating with carbon dioxide a suspension of magnesium carbonate trihydrate in an aqueous solution of potassium salts of strong mineral acids, separating the solid double salt formed from the liquid, treating said double salt at temperatures between 40 and 80° C. with at least such an amount of water as is necessary to obtain an aqueous solution of potassium bicarbonate concentration, calculated as $K_2CO_3$, below 76 g. of $K_2CO_3$ per liter, separating the solution from the magnesium carbonate trihydrate formed by the decomposition of said double salt, recovering the potassium salts from said solution and returning the magnesium carbonate trihydrate obtained into the process for the manufacture of fresh double salt.

4. A method for making potassium salts of carbonic acid which consists in treating with carbon dioxide a suspension of magnesium carbonate trihydrate in an aqueous solution of potassium chloride, separating the solid double salt formed from the liquid, treating said double salt at temperatures between 40 and 80° C., with at least such an amount of water as is necessary to obtain an aqueous solution of potassium bicarbonate concentration, calculated as $K_2CO_3$, below 76 g. of $K_2CO_3$ per liter, separating the solution from the magnesium carbonate trihydrate formed by the decomposition of said double salt, recoving the potassium salts from said solution and returning the magnesium carbonate trihydrate obtained into the process for the manufacture of fresh double salt.

FRIEDRICH RÜSBERG.